Oct. 8, 1935.  T. A. J. HAYES  2,016,494
IGNITION CIRCUIT
Filed April 7, 1932
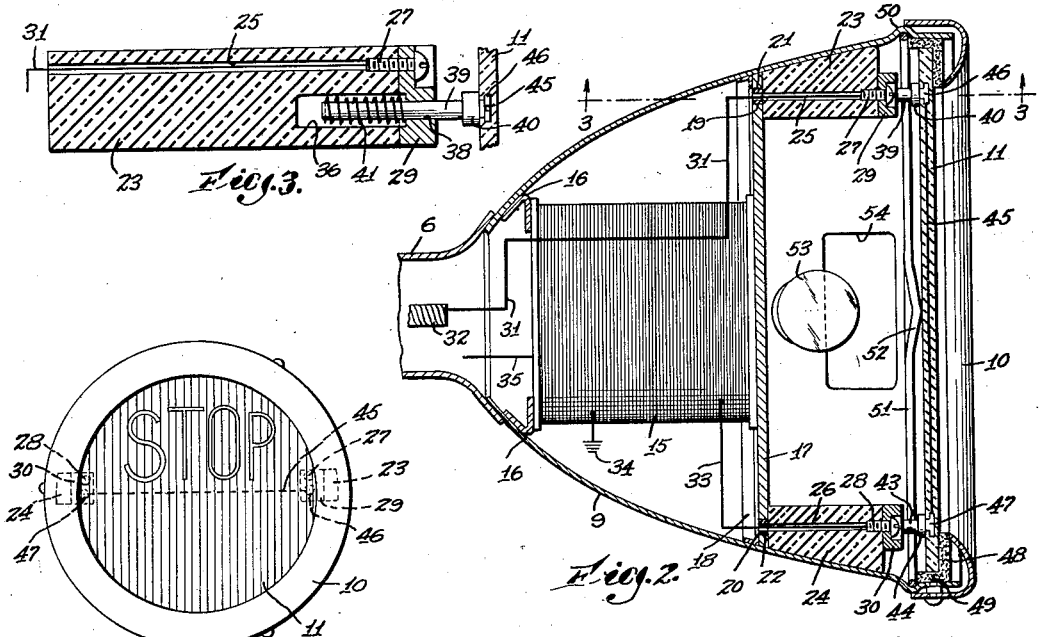
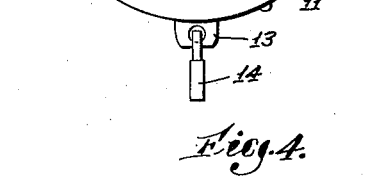
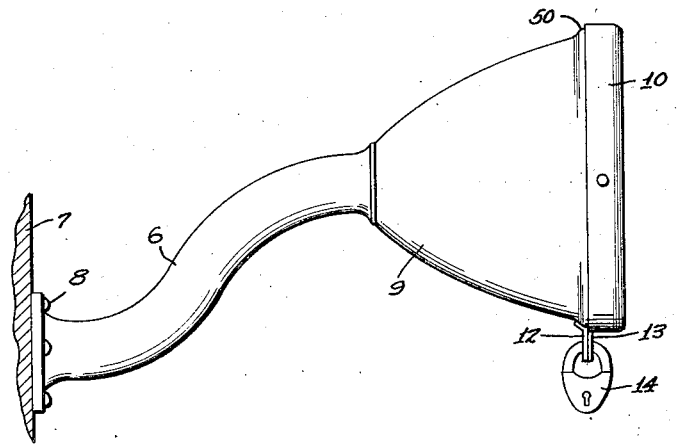
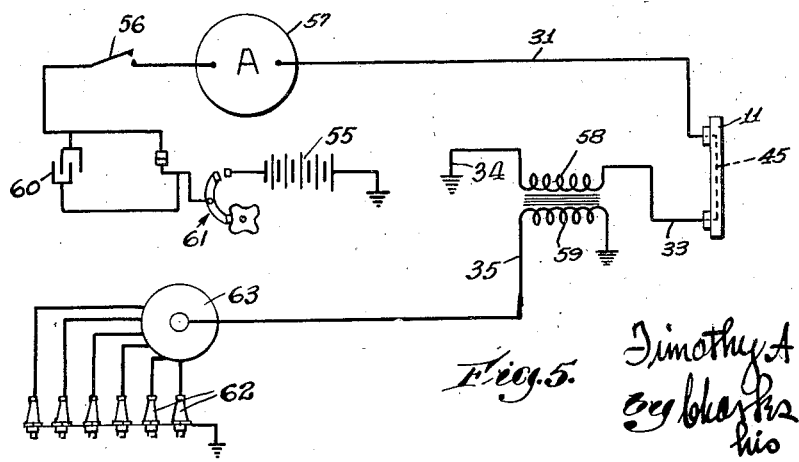

Patented Oct. 8, 1935

2,016,494

UNITED STATES PATENT OFFICE 2,016,494

IGNITION CIRCUIT

Timothy A. J. Hayes, Boston, Mass.

Application April 7, 1932, Serial No. 603,822

13 Claims. (Cl. 180—82)

The present invention relates to motor vehicles, and more particularly to the ignition circuits thereof.

At present there exists in highway traffic management a serious problem caused by speeding motor vehicles. The use of a motorcycle police corps has made it possible to cope with the problem under normal circumstances, that is, in populous districts in the day time, when the amount of traffic renders excessive speed impossible, But the development of the high powered car has created a condition with which the police are unable to cope adequately, for a high powered car, in the night time or when traffic is light and the roadway clear, can outdistance an officer on a motorcycle and so get away when commanded to stop. If it be raining, an officer does not dare follow on the slippery pavements even the lighter, slower speed cars.

True, it is possible for an officer to shoot at a fleeing car, but in this is presented the further difficulty that mere speeding is not an offense serious enough to warrant shooting to kill. An officer knowing a felony has been committed by the driver may be justified in shooting, but without such knowledge, the only safe way out of the dilemma is to give up the chase. There exists at present no means by which a mounted officer can stop the driver of a motor vehicle able to draw away when pursued.

Accordingly, it is the principal object of the present invention to provide a motor vehicle with means whereby it may be brought to a forced stop.

To the accomplishment of this object, a feature of the invention contemplates the provision in a motor vehicle provided with an ignition circuit and the usual switch therein, of an auxiliary switch for breaking the circuit independently of the ignition switch.

Broadly considered, the auxiliary switch may be located for manipulation only by the occupant of the vehicle in order to render it more difficult or even impossible to steal. It may be better to locate the auxiliary switch so that it may be operated by a non-occupant of the vehicle while it is in motion to bring the vehicle to a forced stop. It is preferred, however, to construct and arrange the auxiliary switch so that it may be operated by a mounted officer while in pursuit of a fleeing motor vehicle and at a distance therefrom.

A feature of the invention contemplates the provision in a motor vehicle of a bull's eye which carries a section of the ignition wiring. With such a bull's eye as a target, a traffic officer by shooting, or by the use of his club, can shatter the bull's eye, thereby breaking the ignition circuit and so bring the vehicle to a forced stop. It does not matter whether the car be near, or remote from, the officer. The bull's eye and the wire it carries afford a means whereby the officer, by remote control, can bring a vehicle to a forced stop.

While the present invention, broadly considered, comprises the use of any suitable bull's eye, the most practicable one to use, and the one described in detail herein, is the glass of a tail light.

Apart from traffic management, another serious automobile problem is that of theft. At present the induction coil used in motor vehicles is mounted under the hood near the motor, and is readily accessible. With a coil in such a position theft is made easy by merely shunting a wire across the terminals of the coil and thus cut out the locked switch from the ignition circuit.

Accordingly, to render theft in such manner impossible, it is a further object of the present invention to position the coil so that it is not accessible to a thief, and further, to connect the coil to the ignition circuit in such a way that access, even if gained, will be useless.

To the accomplishment of this object, another feature of the present invention contemplates the provision, in a motor vehicle having an ignition system provided with an induction coil, of means for rendering the coil inaccessible. Preferably, the housing is made in two parts, one of which is connected rigidly to the vehicle and the other one of which is removable from the first named part. By rigidly connecting the first part to the vehicle and by locking the second part to the first part, the induction coil is rendered inaccessible. In addition, the coil is so wired to the circuit that current flowing from the battery will be stopped by the locked ignition switch even though the coil be shunted. While a variety of housings might be effective for this purpose, it is contemplated in the illustrated embodiment of the present invention to use, as the most practicable means, the shell of the same tail light assembly hereinbefore referred to as carrying the wire in the tail light glass.

Other features of the present invention reside in certain devices, combinations and arrangements of parts hereinafter described and then set forth in detail in the appended claims which possess advantages readily apparent to those skilled in the art The various features of the present invention will be readily understood from an inspection of the accompanying drawing illustrating the best form of the invention at present known to the inventor, in which, Figure 1 is a view in side elevation, partially in section, of the tail light assembly attached to an automobile;

Fig. 2 is a view in plan, partially diagrammatic and partially in section, of the shell and its contained elements;

Fig. 3 is an enlarged detail view in sectional elevation of the insulators and current conducting means carried thereby, taken generally on the line 3—3 of Fig. 2;

Fig. 4 is a view in rear elevation, and

Fig. 5 is a diagram of the ignition system of an automobile equipped with the present invention.

The illustrated embodiment of the present invention presents the external appearance indicated in Fig. 1. A tubular, goose-neck support 6 is secured to the body of an automobile 7 by means of rivets 8, so as to form a connection that will not permit tampering. Welded to the other end of the support 6 is a shell 9 carrying at its open end an annular arched rim 10 which encloses a tail light glass 11 (Fig. 2). The rim 10 is secured to the shell 9 in the usual bayonet slot manner for automobile head light constructions. In addition, however, the shell 9 and the rim 10 are provided with apertured ears 12 and 13, respectively (Fig. 1), which may be locked together by a padlock 14, so that the rim can not be turned or removed from the shell by some unauthorized person. In this manner is produced a thief-proof covering for the elements carried within.

In the use of the present invention in automobiles, the induction coil 15, usually placed near the motor, is located within the shell 9 to the front thereof by means of brackets 16 welded to the shell.

A disk-shaped armor plate 17 abuts the rear end face of the induction coil 15, and is held in position on one side within the shell 9 by a flanged, beveled ring 18 which is secured to the shell 9. The armor plate 17 is provided with two openings 19 and 20 in which are secured insulated sleeves 21 and 22. Holding the armor plate 17 against the ring 18 are two insulator blocks 23 and 24 secured to the walls of the shell 9 (Fig. 2).

The insulator blocks 23 and 24 are provided with passages 25 and 26, respectively, which run longitudinally therethrough, registering with the sleeves 21 and 22 in the armor plate 17. The passages 25 and 26 are enlarged slightly at their outer ends to receive the ends of screws 27 and 28, respectively, which secure current conducting, countersunk plates 29 and 30 to the insulator blocks 23 and 24, respectively.

Leading from the battery of the automobile through the interrupter 61 and the ignition switch 56 is an insulated wire 31 which passes through the support 6, the shell 9, the sleeve 21 and the block 23. The end of the insulated wire 31 is soldered to the threaded end of the screw 27. The wire is suitably protected within the support 6 by an armored cable 32.

In a similar manner, an insulated wire 33 is soldered to the screw 28, and passes through the block 24 and the sleeve 22 to form a connection with the primary winding of the induction coil 15. The primary winding is grounded to the shell 9 as diagrammatically indicated at 34 (Fig. 2). An insulated wire diagrammatically shown at 35 leads from the grounded secondary winding of the coil 15 to the elements of the ignition system in the forward portion of the automobile.

To carry into the induction coil 15 the electric current coming from the battery, the plates 29 and 30 and the tail light glass 11 are provided with means for completing the circuit.

As shown in Fig. 3, the block 23 is provided with a hole 36 spaced from the passage 25 which carries the insulated wire 31. Registering with the hole 36 is a passage 38 formed in the plate 29. Fitting snugly in the passage 38 is a rod 39 terminating on its outside end in a flat surfaced head 40. The other end of the rod projects into the hole 36 and is held in position by the coiled spring 41, one end of which may pass through a hole adjacent the end of the rod 39 and the other end of which is welded or attached in some suitable manner to the plate 29. The spring 41 maintains normally the flat surface 40 in its extended position, (Fig. 3). Inasmuch as the plate 29 is made of current conducting material, the current passes from the screw 27 through the flat end 40 of the rod 39 which serves as a terminal. The block 24 is provided with a rod 43 terminating in its outer end in a flat head 44 and maintained advanced by a spring (not shown), the construction and mode of operation being identical with the rod 39.

To complete the circuit, the tail light glass 11 is provided with a wire 45 embedded therein and running transversely across the face of the glass as shown in Fig. 4. Secured to the ends of the embedded wire 45 are terminals or contact points 46 and 47, also embedded in the glass, one face of each being flush with the back face of the glass 11. The contact points 46 and 47 are positioned so as to register with the flat surfaced heads 40 and 44, respectively. In this manner, the electric current passes from the rod 39 through the contact point 46, the wire 45, and the contact point 47, and into the rod 43, and the flat heads 40 and 44 are maintained in contact with the terminals or contact points 46 and 47 by means of the yielding resistance offered by the springs 41 on the rods 39 and 43. It will be apparent that the glass 11 constitutes a cover for the exposed terminals 40 and 44.

To prevent the tail light glass from vibrating, a felt washer 48 is positioned between the exposed face of the glass 11 and the end of the inner wall of the arched rim 10, as shown in Fig. 2. The washer 48 is provided with an integral annular wall 49 positioned between the periphery of the glass 11 and the rim of the shell 9. To complete the holding of the glass 11, the shell 9 is provided with a ridge 50 in which fits an annular spring wire 51. At intervals about its circumference the spring wire 51 is bent as shown at 52, the bent portions pressing the glass 11 against the washer 48.

Fig. 2 shows the tail light bulb 53 and the opening 54 in the shell 9 permitting light to play upon the license plate. These parts form no feature of the present invention for it is not concerned with the lighting circuit.

Fig. 5 shows an ignition system diagram of an automobile provided with the present invention. Current flows from the grounded battery 55, through the interrupter 61, the condenser 60, the switch 56, and the ammeter 57. Leaving the ammeter, the current passes through the wire 31, the screw 27, the plate 29, the rod 39, the contact point 46, the wire 45 embedded in the tail light glass 11, the contact point 37, the rod 43, the plate 30, the screw 28, the wire 33, and so through the primary winding 58 of the induction coil which is grounded. From the grounded secondary winding 59 the induced current set up flows through the distributor 63 to the spark plugs, indicated at 62. Stated more simply, the wire 45 is connected to the ignition circuit between the switch 56 and the induction coil 15, with the ammeter 57 between the switch 56 and the wire 45, and the switch 56 is connected to the circuit between the battery 55 and the wire 45, with the interrupter 61 and the condenser 60 between the battery 55 and the switch 56, and with the ammeter 57 between the switch 56 and the wire 45.

The use of the present invention in an automobile enables an officer to stop a fleeing car by remote control. The wire 45 embedded in the tail light glass 11 has the same operation as a switch of normal construction, for it opens or closes the ignition circuit. The tail light glass 11 forms an effective bull's eye target. A traffic officer may shatter the glass by beating it in with a club or by shooting at the bull's eye from a distance, and the shattering of the glass breaks the electrical connection to the induction coil 15 and the spark plugs 62, causing the automobile to stop immediately. At the same time the armor plate 17 prevents bullets or flying glass from injuring the coil.

Viewing the present invention from an entirely different angle, the owner of an automobile equipped with it need not worry about the theft of his car. The placing of the induction coil 15 within the tail light assembly and behind the armor plate 17 makes it both impossible and useless to try to shunt a wire across the terminals of the coil. Even if some ingenious person were able to effect such a shunting, it would still be ineffective for starting the motor because the placing of the ignition switch 56 between the battery 55 and the housed coil 15 means that a thief would still have to cope with the locked ignition switch 56.

Inasmuch as the wire 45 carried by the tail light glass 11 is, in effect, a second switch for the ignition circuit, for it opens and closes the circuit as does the ignition switch 56, it is clear that the owner of an automobile equipped with the present invention may lock his car doubly by removing the glass 11. Again, the sight of a car driven without a tail light glass and with a wire connecting the flat heads 40 and 44 would at once excite suspicions of theft of the car so driven.

Finally, the solid construction disclosed, whereby the housing parts of the assembly are welded and locked together and the whole assembly is riveted to the body of the automobile, is designed to prevent a thief from tampering with the construction or from getting access to the coil.

The present invention has been described as being incorporated with a tail light assembly. It is clear, however, that the invention disclosed herein is much broader, for a housing provided with a bull's eye may be used having no physical connection with the tail light assembly since the present invention is not concerned with the lighting system. Moreover, the present invention is not confined to use merely on automobiles, for it is equally well adapted for use on power watercraft. Accordingly, it will be clear to those skilled in this class of devices that with the general objects of the present invention in view, changes may be made in the details of structure, the described and illustrated embodiment thereof being intended as an exploitation of its underlying essentials, the features whereof are definitely stated in their true scope in the claims herewith.

What is claimed as new, is:

1. In a motor vehicle, the combination with an ignition circuit provided with the usual ignition switch and with spaced terminals exposed to view on the exterior of the vehicle, of a removable cover for the terminals provided with means for maintaining them normally connected electrically.

2. In a motor vehicle, the combination with an ignition circuit provided with the usual ignition switch and with spaced terminals, of a glass cover exposed to view on the exterior of the vehicle and provided with contacts engaged with the terminals, respectively, and a wire embedded in the glass and forming an electrical connection between the terminals through the contacts.

3. In a motor vehicle ignition circuit, the combination with a tail light assembly including a glass, and spaced ignition circuit terminals carried by the assembly independently of the glass, of means carried by said glass adapted to engage the terminals and forming a section of the ignition circuit.

4. In a motor vehicle ignition system, the combination with a shell, ignition circuit wires provided with terminals housed by said shell, a rim carried by said shell and a bull's eye secured in position by said rim and provided with means for closing the ignition circuit through said terminals, of means carried by the shell and the rim for locking the rim in position to maintain the circuit closed.

5. In a motor vehicle, the combination with an ignition system provided with an induction coil, a shell carrying a bull's eye and exposed to view exteriorly of the vehicle body for housing said coil, and ignition circuit wires carried by said shell and provided with terminals, of means carried by the bull's eye adapted to engage the terminals for closing the ignition circuit through said terminals.

6. In a motor vehicle, the combination with an ignition system provided with an induction coil, a shell carrying a bull's eye for housing said coil, ignition circuit wires carried by said shell and provided with terminals, and an armor plate interposed between the bull's eye and the coil and carried by the shell for protecting the coil upon a shattering of the bull's eye, of means carried by the bull's eye adapted to engage the terminals for closing the ignition circuit through said terminals.

7. In a motor vehicle ignition system, the combination with a shell housing ignition circuit wires provided with terminals, of a bull's eye removably secured in said shell and provided with a section of the ignition circuit, said section comprising a wire and contacts secured thereto and adapted to engage the terminals.

8. In a motor vehicle ignition system, the combination with a shell housing ignition circuit wires and a bull's eye carrying a wire provided with contacts, of terminals carried by the shell electrically connected to the ignition circuit wires, and resilient means for maintaining the terminals in engagement with the contacts.

9. In a motor vehicle ignition circuit, the combination with a tail light assembly including a glass, an induction coil housed by said assembly, spaced ignition circuit terminals carried by said assembly, and contacts carried by the glass in engagement with the terminals, of means carried by the glass and connecting the contacts forming a section of the ignition circuit.

10. In a motor vehicle ignition circuit, the combination with a tail light assembly including a glass, spaced ignition circuit terminals carried by said assembly, and contacts carried by the glass in engagement with the terminals, of a wire embedded in the glass forming an electrical connection between the terminals through the contacts.

11. In a motor vehicle, the combination with a tail light assembly housing an induction coil and carrying a glass, ignition circuit wires provided with terminals housed by said assembly, an armor plate carried by the assembly interposed between the coil and the glass to protect the coil upon a shattering of the glass, and means carried by the glass including contacts adapted to engage the terminals for closing the ignition circuit through the terminals.

12. In a motor vehicle, the combination with an ignition circuit provided with the usual ignition switch and with spaced terminals, of a removable cover for the terminals, said cover being exposed to view on the exterior of the vehicle and provided with means adapted to engage the terminals to maintain them normally connected electrically.

13. In a motor vehicle, the combination with an ignition circuit provided with the usual ignition switch and with spaced terminals, of a removable cover for the terminals, said cover being exposed to view on the exterior of the vehicle and provided with means embedded therein adapted to engage the terminals to maintain them normally connected electrically.

TIMOTHY A. J. HAYES.